United States Patent [19]

Payne

[11] Patent Number: 5,061,842
[45] Date of Patent: Oct. 29, 1991

[54] ERASURE MECHANISM FOR CARD READERS

[75] Inventor: Kenneth Payne, Peakirk, United Kingdom

[73] Assignee: Ampy Automation - Digilog Limited, Peterborough, United Kingdom

[21] Appl. No.: 374,754

[22] Filed: Jul. 3, 1989

[30] Foreign Application Priority Data

Dec. 7, 1988 [GB] United Kingdom ............... 8816511

[51] Int. Cl.$^5$ .................. G06K 7/08; G11B 5/325
[52] U.S. Cl. .................. 235/449; 235/450; 360/2; 360/118
[58] Field of Search .............. 235/449, 50, 493, 437, 235/379, 380, 482, 475; 346/74.2, 74.3, 74.5; 360/2, 104–106, 118

[56] References Cited

U.S. PATENT DOCUMENTS

| 3,836,753 | 9/1974 | Pass .................. 235/477 X |
| 3,929,278 | 12/1975 | Balavoine et al. .................. 360/2 X |
| 4,587,571 | 5/1987 | Anderson et al. .................. 360/2 |
| 4,703,379 | 10/1987 | Bogdanski et al. .................. 360/118 |
| 4,711,993 | 12/1987 | Kosednar et al. .................. 235/380 |

FOREIGN PATENT DOCUMENTS 8103562 12/1981 World Int. Prop. O. .

Primary Examiner—Stuart S. Levy
Assistant Examiner—Steven M. duBois
Attorney, Agent, or Firm—Lee, Mann, Smith, McWilliams & Sweeney

[57] ABSTRACT

A card reader having a card reading mechanism, a card perforating device and a card erasure mechanism, wherein the erasure mechanism comprises a permanent magnet movable by means of a pivoted arm towards and away from a card erasure position, and a drive means for the magnet arm which is coupled to a motor drive for the perforating device.

12 Claims, 5 Drawing Sheets

ERASURE MECHANISM FOR CARD READERS

FIELD OF THE INVENTION

This invention concerns card readers and in particular an erasure mechanism for erasing magnetic information stored on a card after the card has been read.

BACKGROUND TO THE INVENTION

Plastic cards bearing a magnetisable stripe are known. Information in the form of differentially magnetised zones of the magnetic stripe can be written using a magnetic write head and can be read by a read head provided there is relative movement between the card and the head.

Where the card is one which signifies pre-payment of a service or facility such as electricity or gas, it is important that the card be cancelled after the card has been entered into a card reader associated with the service or facility for which pre-payment has been made.

A card reader will normally include a reading head and hitherto, adjacent the reading head has been located an erase head comprising an electro-magnet, current for which has been derived from an appropriate control circuit which is triggered to provide the erasure current as soon as the information derived from the read head has been indicated as satisfactory by logic circuitry associated with the reading head. However the current requirements for an erase head and the time required for the current to flow make quite significant demands on the power supply for the unit and in addition, since the current for the erase head is controlled by a processor, the latter cannot be turned off until after the card has been detected as having been removed from the card reader. Again this makes considerable demands on the power supply requirements for the card reader.

It is an object of the present invention to provide an alternative erasure device for erasing magnetically stored information on the card after it has been read.

SUMMARY OF THE INVENTION

According to one aspect of the present invention a permanent magnet is mounted for movement towards and away from position occupied by a card in a card reader, and means is provided responsive to a satisfactory reading of the card to bring the magnet into close proximity or engagement with the region of the card on which magnetically readable information is stored, so as to corrupt and/or erase the magnetically stored information on the card.

Preferably the magnet is carried at the end of an arm which is pivotable to allow the remote end of the arm to move in a direction towards and away from the plane of a card when located in the reader, and a drive is provided for moving the arm, from a position where it is remote from the card to a position in which the magnet is in close proximity to or touching the card, before the card is removed from the reader. The drive means may comprise an electric motor or a solenoid.

According to another aspect of the invention, where the card reader includes a mechanism for perforating the card to indicate that the card has been entered into a card reader and read, the drive for moving the magnet towards the card may to advantage be derived from the drive associated with the perforating mechanism.

Where the perforating mechanism is itself driven by an electric motor and comprises a crank is mounted on the output shaft of the motor at the end of which is located one or more perforating teeth, a rigid mechanical link may be provided from a drive point on the crank to a drive point associated with the mechanism for moving the magnet bearing arm towards and away from the card. In this way rotation of the motor will produce appropriate movement of the magnet and by appropriate choice of the position on the crank for the point of attachment of the rigid link, so the magnet can be brought down into close proximity or contact with the card at the same time as the teeth are brought into contact with the underside of the card, to begin perforation and marking of the card.

The card perforating mechanism is conveniently such as is described in our co-pending British Patent Application No. 2134682.

In order to provide for a degree of resilient engagement between the magnet and the surface of the card, and in order to accommodate manufacturing tolerances in card thickness, size of magnet etc, the arm to which the magnet is attached is conveniently of resiliently deformable material and is itself attached to a yoke which is pivotable about a mounting on the card reader with the axis of pivoting of the yoke approximately parallel to the plane of the card when inserted, and a relatively rigid arm extends from the yoke separate from the arm carrying the magnet, and drive means for moving the yoke (and therefore the magnet into contact with the card), acts on the relatively rigid arm extending from the yoke. By arranging that the drive means for the yoke will tend to move the magnet beyond the position at which it will normally be expected to engage the surface of the card, the resilience in the arm carrying the magnet will accommodate any over travel and simply increase the force exerted between the magnet and the card.

Preferably spring means is provided for restoring the position of the magnet to a position which is well clear of not only the surface of the card but also any read head provided to read information on cards inserted into the reader.

Preferably the spring means acts on the yoke or on a rigid extension to the yoke.

Alternatively a torsion or helical spring may be provided, associated with a pivoting of the arm carrying the magnet.

According to a further aspect of the invention, the read head is mounted directly on a printed circuit board which itself forms part of the card reader and is mounted generally parallel to the plane which is occupied by a card when the latter is inserted in the reader, and adjacent the read head, the printed circuit board is cut away, to enable a magnet to pass through the board for making contact with a card if the latter is located below the printed circuit board.

According to a further feature of the invention, the magnet is carried by an arm which itself is pivotally mounted on the printed circuit board.

According to a still further aspect of the invention, the read head is mounted at the end of a finger of printed circuit board material which is separated from the remainder of the board except at the end of the finger which is remote from the end to which the reading head is attached. Where the printed circuit board material itself possesses a degree of resilience, the read head will, like the magnet, be resiliently mounted relative to the remainder of the board and therefore capable of accommodating different thicknesses of card etc.

More particularly, by arranging that the read head surface which is to make contact with the card, normally protrudes slightly beyond the plane which will be occupied by the surface of the card which is to engage the head when the latter is inserted in the reader and by providing an appropriately curved underside surface to the read head so that on insertion of the card, the leading edge will cause the read head to be raised slightly to allow the rest of the card to pass below the read head, so a degree of pressure can be exerted between the read head and the card by the natural resilience of the finger to which the read head is attached.

Electrical connections to the read head are conveniently formed by means of tracks formed on or in the printed circuit board material forming the finger to which the read head is itself attached.

According to a further preferred feature of the invention, where the printed circuit board material possesses inherent resilience, this characteristic can be incorporated in the improved card reader to provide the restoring force which acts on the drive means for the magnet. Thus if a second finger of printed circuit board material is provided by cutting out three sides of an elongated rectangle leaving one of the shorter sides as the point of attachment for the finger, a return spring can be formed by causing the arm to which the magnet is attached (or drive means for the arm) to engage the the resiliently displaceable finger of printed circuit board material, to displace the latter out of the plane of the printed circuit board as the magnet is moved into its card engaging position. The displacement of the finger of printed circuit board material in this way will automatically cause a restoring force to be exerted in the opposite sense on the magnet bearing arm, so that when free to do so, the arm and magnet will be pivoted in the opposite sense to move the magnet away from the card.

In an embodiment of the invention in which the movement of the magnet bearing arm is itself effected from a drive associated with a card perforating crank, itself driven by an electric motor, it will be seen that the motor will have to drive the crank against the restoring force of the spring acting on the magnet arm. However if it is arranged that the crank can rotate into a position at which the point of attachment of the rigid link between the crank and the drive to the magnet bearing arm is on the same side of the axis of rotation of the crank as are the teeth which, on rotation of the crank are brought into contact with the underside of the card, so the crank and magnet will be held in a position of stable equilibrium with the teeth just engaging the underside of the card and the magnet in contact with the surface of the card, until the card is pulled out of the card reader slot into which it is previously been inserted. The effect of this withdrawal is to cause the teeth to penetrate into the card and mark the card and to travel with the card in the direction of withdrawal, and in so doing, without any power requirements, the crank will be further rotated and this will in time cause the magnet to be raised clear of the card surface.

As soon as the card is free of the teeth, the return spring effect will tend to rotate the crank through the rigid link mechanism until the crank has rotated to a position at which the axis of rotation of the crank and the two pivot points at opposite ends of the rigid link, occupy the same straight line.

Conveniently a short rigid finger engaging lug extends perpendicularly from the yoke or rigid arm extending from the yoke, and this lug is arranged to engage the printed circuit board material finger providing the resilient restoring force.

It will be seen that by providing a mounting for the magnet which has a natural springiness, the magnet can be maintained in contact with the card during withdrawal of the card for any desired period of time depending on the amount of overtravel which is accommodated by the natural resilience of the arm carrying the magnet. Typically the magnet is kept in close proximity to or actually in contact with the card during a rotation of approximately 30° C. of the crank carrying the perforating teeth.

Conveniently the card reader includes a socket into which a card can be inserted and the socket is itself formed by two plastics moulded parts. An electric motor for driving the crank may be carried by one of the moulded parts and the printed circuit board and magnet mounting and drive mechanism are carried by the other part. The rigid link between the magnet driving mechanism and the crank are frequently detachable to allow the two modeled parts to be assembled or separated, the crank being fitted after assembly or removed before separation.

Conveniently the drive motor includes regions of reduced diameter at opposite ends of its housing and the moulded part to which the motor is to be attached includes two resiliently deformable yokes which can be fitted over the reduced diameter end regions of the motor to hold the motor against the moulding and secure it in place. Such a method of mounting obviates the need for screws or rivets.

Preferably a sufficiently strong permanent magnet is employed that it is only necessary to bring the magnet into close proximity to the magnetic stripe on the card to cause corruption of the data carried by the stripe. In this way it is not essential to produce relative movement between the card and the magnet to effect corruption and erasure. This is important since otherwise it might be possible for an unscrupulous customer to attempt to prevent erasure by inserting a thin separating element between the magnet and the card before the latter is removed. According to another aspect of the invention, in a card reader a sequence of reading and erasing a card comprises the steps of (1) inserting a card into a slot in the reader, (2) causing magnetic information stored on the card to be read from the card and converted into electrical signals as the card moves past a read head located in the reader during insertion, (3) performing an electrical check on the information derived from the read head to provide a confirmation signal in the event that the information is of a satisfactory format, (4) producing a confirmation signal to indicate that information has been read satisfactorily and using the confirmation signal to generate a short duration pulse of operating current for a motor associated with the reader to rotate a mechanism bearing a magnet into close proximity or contact with the region of the magnet stripe on the card bearing the information which has been read, the drive means being prevented from rotating completely whilst the card is in position, and (5) removing the card from the slot and in so doing enabling the drive means to rotate into a position in which the magnet is now held away from the plane which normally will be occupied by a card when the latter is inserted into the slot, the magnet being moved into this position under the action of the restoring force.

It should be noted that if the information received by the read head and associated circuits is not found to be in a correct format, there is no energisation of the crank drive, no magnetic erasure and no perforation of the card. This enables the card to be removed from the slot and is necessary since the successful reading of the information on the card is partly dictated by the relative speed and general smoothness with which the card is inserted into the slot. It is possible for the card to be perfect in all regards but for the information not to be read correctly due to incorrect insertion and in these situations it is important that no magnetic erasure of the card should occur, to enable the user to remove the card and re-insert the card for a second attempt.

It should be noted that by using the electrical signal for the motor to effectively operate the magnet into an erase position, no additional signal is required and no electric current is required for an erase head.

The invention of now be described by way with example with reference to the accompanying drawings in which FIG. 1 is a top perspective view of a card reader mechanism bearing a read head and erase magnet, FIG. 2 is a side view of the mechanism shown in FIG. 1 with part of the structure removed to show the relatively movable parts with the magnet in a lowered position, in contact with a card, FIG. 3 is a similar view to that of FIG. 2 showing how the crank carrying the perforating teeth is rotated as the card is withdrawn from the slot, FIG. 4 is an enlarged scrap view, of a generally perspective nature, showing the magnet mounted in a cylindrical sleeve carried at the end of the resilient arm, FIG. 5 is a top plan view of the printed circuit board with the erase magnet and support and drive mechanism removed, FIG. 6 is a view of the card with the magnetically stored information revealed by the presence of fine black magnetic particles dusted on the surface, FIG. 7 shows the card after erasure showing how erasure leaves no pattern when dusted with magnetic particles.

FIG. 8 and FIG. 9 show the two inside faces of the two mouldings after the latter have been slid apart and the part bearing the motor has been rotated through 180°, to the position shown in FIG. 9, and FIG. 10 is a reverse plan view of the housing section shown in FIG. 9 with the motor in place.

DETAILED DESCRIPTION OF THE DRAWINGS

FIG. 1 of the drawings illustrates part of a card reader mechanism which is formed from two plastics mouldings which when fitted together form inter alia a parallel slot into which a card 10 can be inserted, and which carry a printed circuit board 12 on one side and an electric motor 14 on the other side. The motor has an output shaft 16 on which is mounted a crank 18 having metal teeth 20 carried at the far end of the crank and which when rotated by the motor to engage the underside of a card, will perforate the latter as the card is withdrawn from the slot.

The printed circuit board is cut away to define two resilient fingers one of which can be seen at 22 and carries on its underside a reading head 24, and the other of which can be seen at 26 and which serves as a return spring for a magnet operating mechanism to be described.

The card includes a strip of magnetisable material 28 which can be differentially magnetised to produce a magnetic pattern which can be read by the read head 24 as the card is moved relative to the head. In known manner such relative movement causes induced currents in the reading head as the differentially magnetised regions of the stripe move relative to the head. These induced currents can be converted into voltages and amplified in known manner to provide electrical signals for processing.

The card reader is of the type in which, after being read satisfactorily, the magnetic information is to be erased so that the card cannot be used again. To this end a small powerful permanent magnet which is best seen in FIG. 4 and is designated by reference numeral 30 is carried at the lower end of a cylindrical housing 32 carried at the free end of a resiliently deformable arm 34 of plastics material possessing a high degree of springiness.

As best seen in FIG. 1, the arm 34 extends from and is secured to the center of a yoke 36 the ends of which straddle a mounting block 38, and is pivotable relative thereto about an axis parallel to the plane of the printed circuit board 12. The block 38 is in fact mounted on the printed circuit board.

At one end, the yoke is extended to form a rigid operating arm 40 the outboard end of which includes a pin 42. The pin provides a mounting for a sleeve 44 which is attached to one end of a rigid connecting rod 46 the other end of which includes a similar sleeve 48 for pivotally mounting on a pin 50 which extends from the crank 18. In this way the crank is connected to the end of the rigid arm 40 so that rotation of the crank will produce pivotal movement of the arm 40 and therefore the yoke 36. This in turn will produce a pivoting movement of the arm 34 and therefore a raising or lowering of the magnet.

The normal rest position for the magnet and crank is as shown in FIG. 1. In this condition the card 10 can be inserted freely into the slot to pass below the read head to the position shown in FIG. 2 where the card is fully inserted in the slot.

If the insertion of the card has produced a correct set of signals from the read head 24, as checked by electrical circuitry (not shown), electrical power is provided to the motor 14 albeit momentarily, to cause the latter to rotate in the direction of the arrow 52 and cause the crank to rotate into the position shown in FIG. 2 where the first of the three teeth 20 is just impaled on the underside of the card 10. In this mode the crank will have rotated the pin 50 just beyond its lowermost position in which the link 46 will have been drawn into its downmost position and thereby also the magnet likewise. The length of the housing 32 is selected so that the magnet 30 will have been brought into contact with the card at or just before bottom dead center of the pin 50 so that there is good reliable contact between the magnet and the card.

If the card is now withdrawn in the direction of arrow 54 see FIG. 3, the crank will be rotated in the same direction as arrow 52 but this time, as a result of the engagement of the teeth 20 with the card material, as the latter is moved linearly the crank is moved rotationally. This in turn allows the pin 50 to rise to the position shown in FIG. 3 where the last of the teeth is just leaving the card. In this position the magnet housing 32 will have also been raised so that the magnet 30 is now clear of the surface of the card, however, for at least the initial sliding movement of the card, the magnet will have remained in contact with the surface of the magnetic stripe so as to more completely erase and corrupt any data stored in the magnetic stripe.

The restoring force provided by the finger of printed circuit board material 26 acts through a pin or lug 56 which extends from the underside of the rigid arm 40.

The axis about which the yoke 36 rotates can be seen at 58 in FIGS. 2 and 3.

The motor is held in position by means of two modeled plastics yokes which extend from the underside of the lower housing part 60. One of these U-shaped yokes can be seen at 62 in FIGS. 1, 2 and 3. The other U-shaped yoke holding the motor in position can be seen in FIG. 10 and is designated by reference numeral 64.

Electrical connections to the read head are conveniently formed by tracks such as 66 and 68 on the finger of printed circuit board material 22 on which the read head is mounted.

In FIG. 5 the position which is occupied by the circular section magnet 30 and housing 32 is shown in dotted outline at 70. Likewise the position at which the lug or pin 56 engages the free end of the resilient finger 26 is shown at 72.

FIG. 6 is a plan view of the card 10 where the magnetic stripe 28 has had information stored therein in a magnetically readable form. This comprises a number of discreet and small locally magnetised regions which can be revealed by spreading a thin layer of black magnetic powder over the magnetic stripe and then shaking the powder off the stripe, leaving black powder adhering to the regions which have been strongly and locally magnetically orientated. One of these local regions is denoted by reference numeral 74.

After a permanent magnet such as 30 is brought into contact or close proximity with the locally magnetised regions 74, so the magnetic pattern is corrupted and erased. This is achieved before the card is pulled out of the slot and thus renders the card unusable if it has been correctly read upon insertion.

It is to be noted that power to the motor 14 is not provided in the event that the card is not read satisfactorily on insertion. In that event the magnet s held clear of the card and the user can withdraw the card and reinsert it into the slot again for a second or other attempts, until such time as the card is satisfactorily read. Only then will the motor be rotated and the magnet lowered so as to erase the information.

The two parts contain lugs at 76 and 78, 80 and 82 under which co-operating lugs 84, 86, 88 and 90 can slide. The two curved edges of the two parts at 92 and 94 co-operate to form a flared entrance to the slot.

Figure 9:
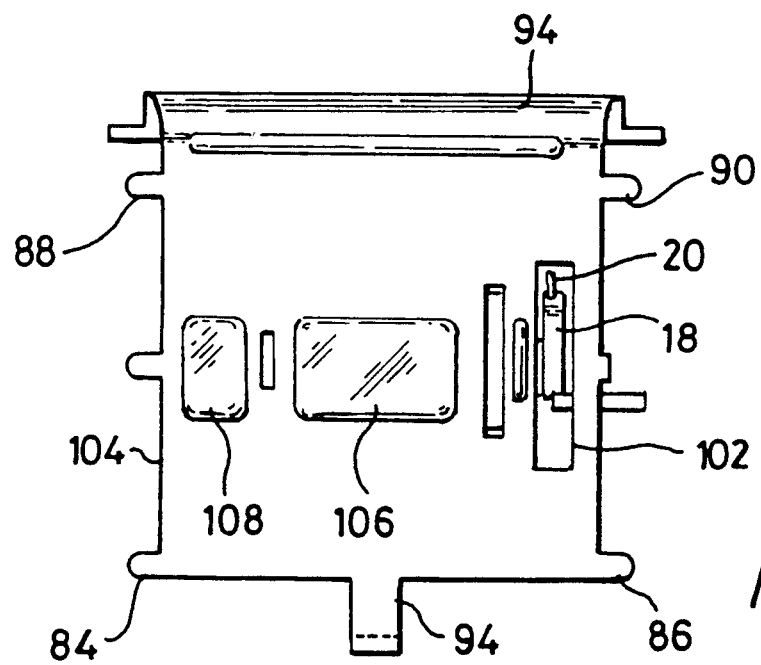
FIGS. 8 and 9 show the two parts which fit together to form the slot into which the card can slide.
Figure 8:
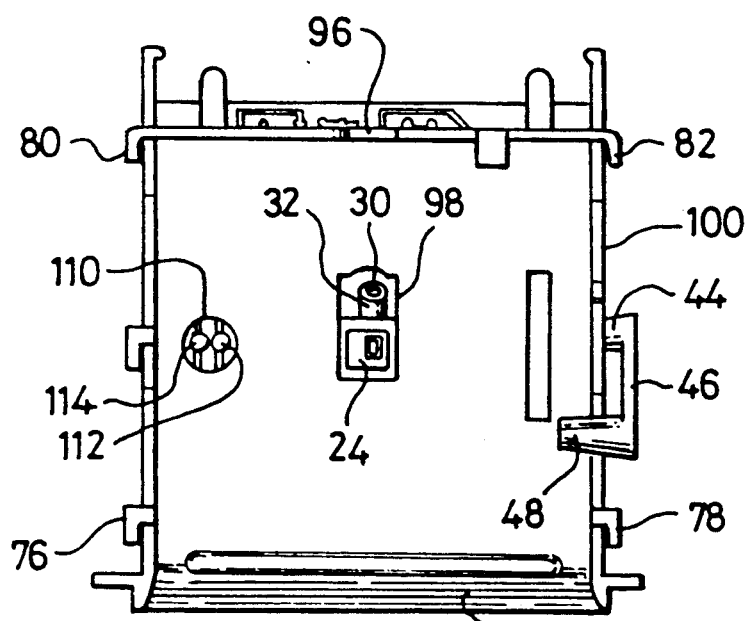
Figure 10:
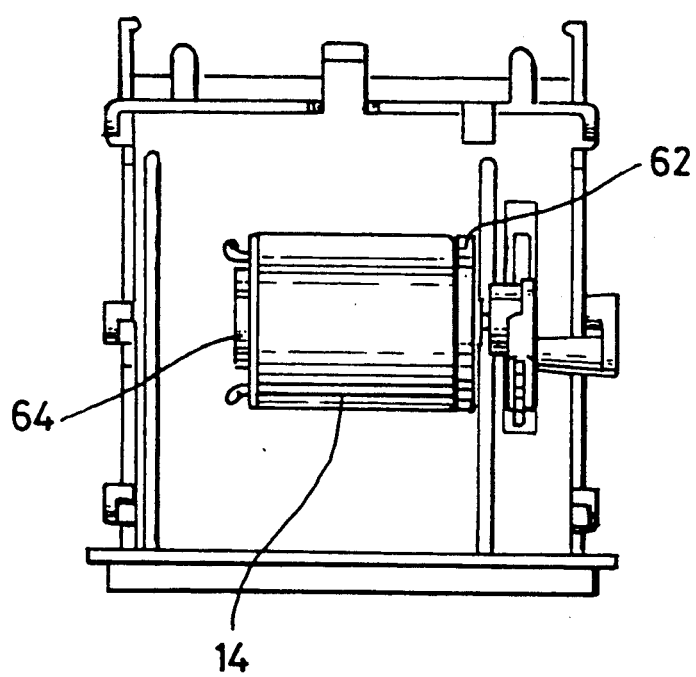

As shown in FIGS. 8 and 9, the two components have been laid in the same plane with the internal faces (which normally face one another when the two parts are assembled), both visible. Thus the protruding tang 94 engages in a slot 96, when the parts are assembled.

The read head 24 can be seen through a window 98 in the component part 100 whilst the crank 18 and teeth 20 can be seen through a slot-like window 102, in the other component part 104.

An upstanding platform 106 ensures good contact between the card and the read head 24 and a similar upstanding platform 108 ensures that the card is flattened against a circular window 110 through which can be seen a light emitting diode 112 and a light sensitive junction 114. The latter are positioned so that when a white card has been inserted into the slot so that the window 110 is covered by white material, sufficient light from the light emitting diode is reflected onto the light sensitive junction to allow an electrical signal to be generated indicating the presence of the card in the slot. This signal is used to designate when the read head is to be rendered operable. If the signals from the read head are satisfactory, current is then supplied to the motor 40 to rotate the crank 18, in the manner as aforesaid.

Also visible in FIG. 8 is the interconnecting link 46 with the sleeves 44 and 48.

Whilst the crank 18 is conveniently moulded from a plastics material, the teeth 20 are preferably formed from sheet metal such as brass.

Conveniently the yoke 36 and arm 34 and housing 32 are also moulded integrally from plastics material as is also the link 46 and sleeves 44 and 48.

Figure 1:
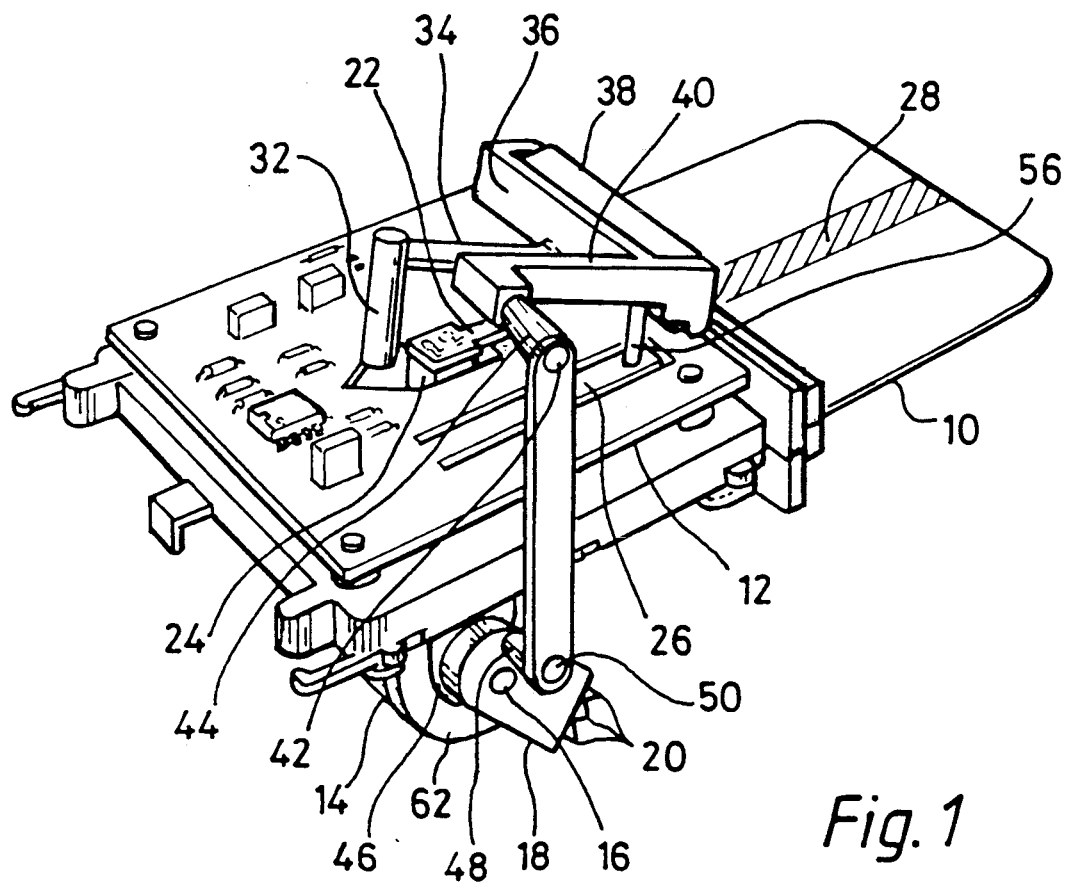
Figure 2:
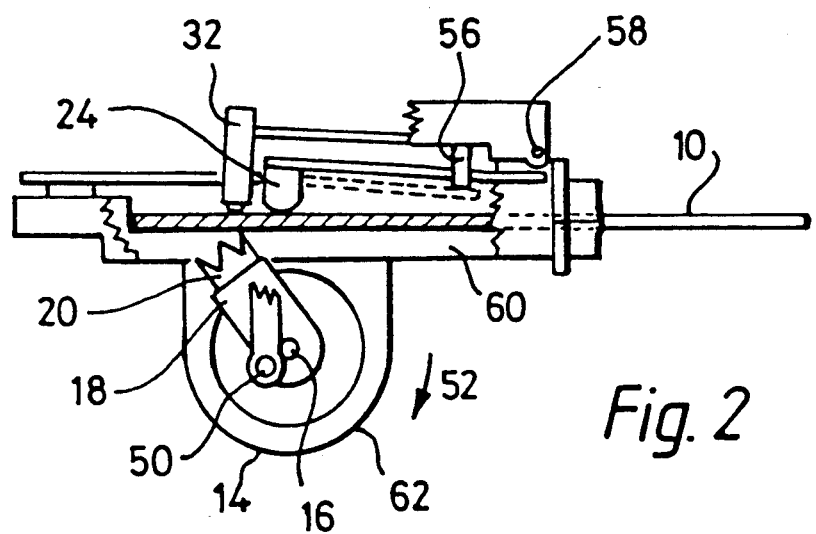
Figure 3:
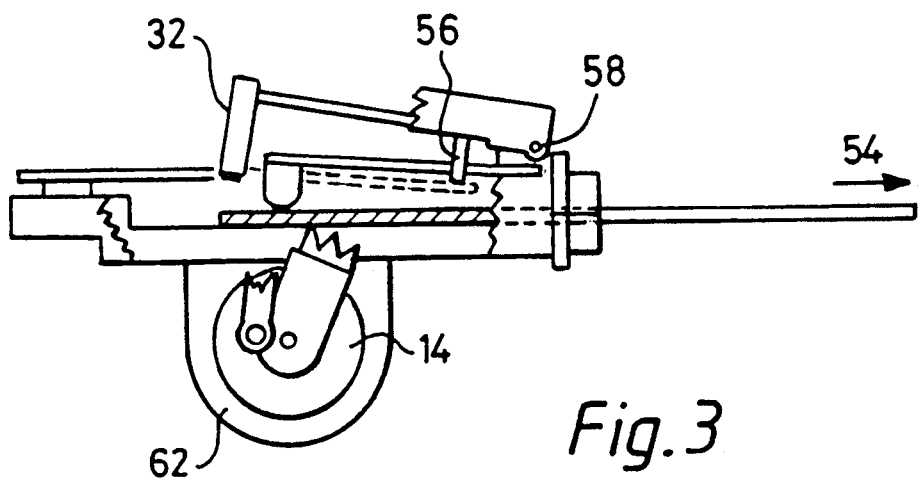
Figure 4:
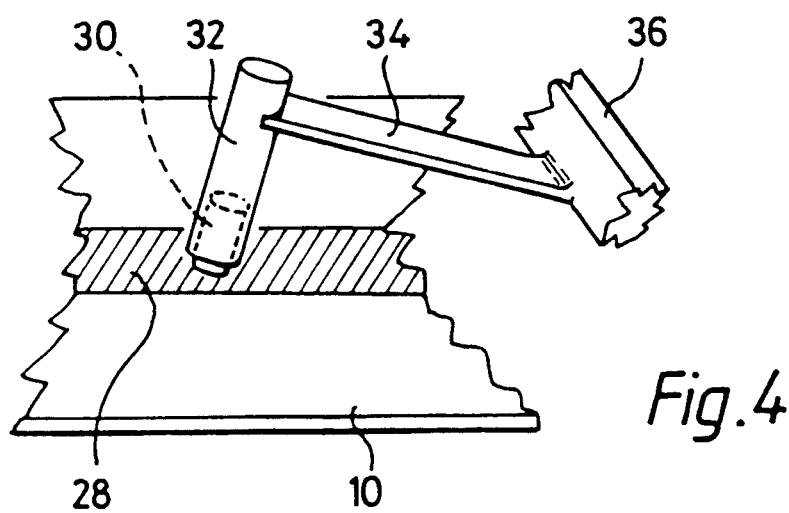
Figure 5:
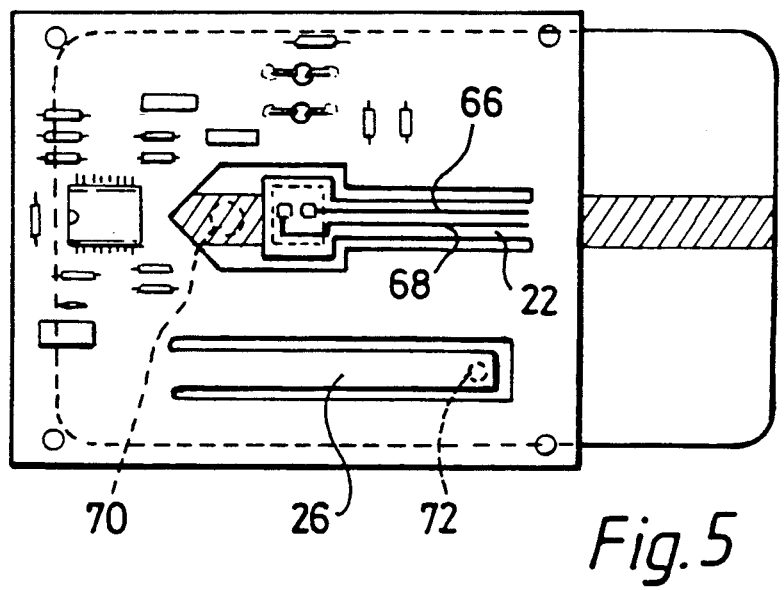
Figure 6:
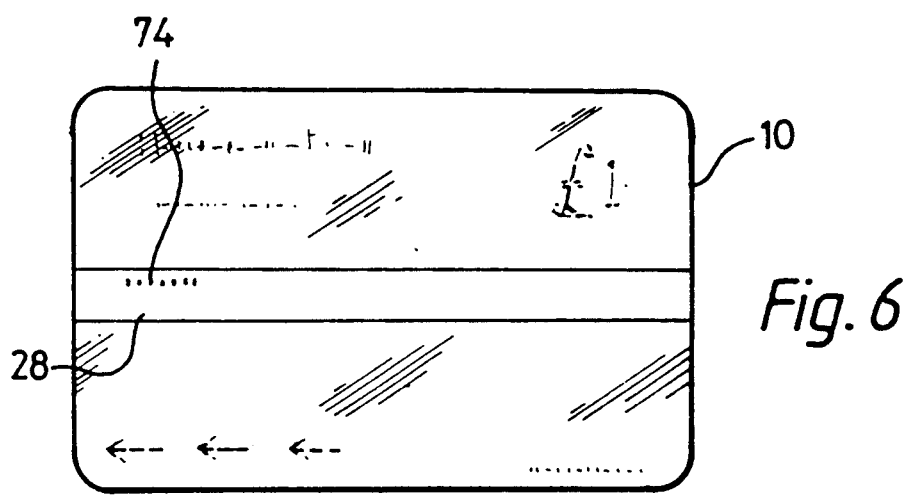
Figure 7:
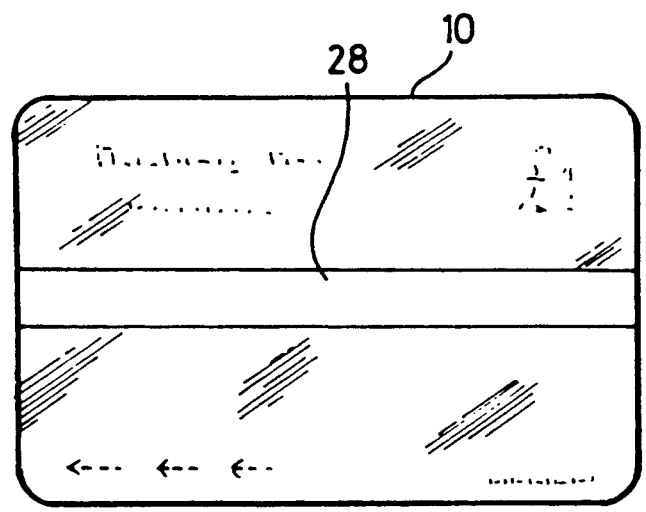
FIG. 7 shows a card which has been erased so that after dusting with black magnetic dust it does not reveal the appearance of any information such as 74 as in FIG. 6.

Lastly the window 98 permits the underside of the magnet 30 and surrounding housing 32 to just be seen in the elevated position in which the magnet is well clear from the card and the read head 24, i.e., the position shown in FIG. 1.

I claim:

1. A card reader having a card information reading mechanism and a card information erasure mechanism, the card erasure mechanism comprising a permanent magnet, means mounting the magnet for movement towards and away from a position occupied by a card inserted in the card reader, and first drive means operable in response to a satisfactory reading of the card for moving the magnet into at least close proximity with a region of the card on which magnetically readable information is stored, so as to destroy the magnetically stored information on the card, wherein said reading mechanism comprises a perforating device for perforating the card in response to the card being inserted into the card reader and read, second drive means for the perforating device, and a rigid mechanical link connected between said perforating device and said first drive means, whereby the drive means is driven from said second drive means.

2. A card reader according to claim 1, further comprising an arm, the magnet being carried at one end thereof, means pivotally mounting the arm to allow said one end of the arm to move in a direction towards and away from the plane of the card position, and means coupling the drive means with the pivoted arm for moving said arm from a position where the magnet is remote from the card position to a position in which the magnet is at least in close proximity to an inserted card, after the card has been satisfactorily read.

3. A card reader according to claim 1, wherein said perforating device is itself driven by a motor and comprises a crank at the end of which are located perforating teeth, and means mounting the crank on an output shaft of said motor, and wherein said rigid mechanical link connects a drive point on said crank to a drive point associated with said first drive means moving the magnet towards the card position.

4. A card reader according to claim 3, wherein said first drive means comprises motor means acting to drive said crank against a spring means, and wherein the crank is driven by said motor means into a position at which the point of attachment of said rigid mechanical link between the crank and said first drive means is on the same side of the axis of rotation of the crank as said perforating teeth, whereby the crank and magnet are held in a position of stable equilibrium with the teeth just engaging the card and the magnet in contact with the card, and wherein, when the card is withdrawn from the card reader, the teeth penetrate into the card and mark the card and travel with the card in the direction of withdrawal such that the crank is further rotated to cause the magnet to be moved out of its erasure position, and restoring force rotates the crank through the rigid link until the crank has rotated to a position at which the axis of rotation of the crank and the two pivot points at opposite ends of the rigid link occupy the same straight line.

5. A card reader according to claim 1, further comprising spring means acting on the first drive means to assist in restoring the position of the magnet to a position remote from the card position.

6. A card reader according to claim 1, wherein the card read mechanism includes a read head mounted directly on a printed circuit board which itself forms part of the card reader and is mounted generally parallel to the plane of the card position, and adjacent the read head the printed circuit board is cut away to enable the magnet to pass through the board into its erasure position, the magnet being movably carried by said printed circuit board.

7. A card reader according to claim 6, wherein the read head is mounted at the end of a finger formed from the printed circuit board.

8. A card reader according to claim 7, wherein a second finger formed from the printed circuit board material is provided to generate a restoring force acting on the drive means for the magnet.

9. A card reader according to claim 1, having a card entry and withdrawal slot formed by two plastics moulded parts, an electric motor carried by one of the moulded parts, and a printed circuit board, card reading mechanism, permanent magnet mounting and magnet drive means carried by the other part, the magnet drive means being coupled to the motor by a detachable crank for allowing the two plastics parts to be assembled or separated.

10. A card reader according to claim 1, wherein a sufficiently strong permanent magnet is employed that it is only necessary to bring the magnet into close proximity to the card to cause corruption of the data.

11. A method of reading and erasing information on a card in a card reader, comprising the steps of:

(1) inserting a card into a slot in the reader, (2) causing magnetic information stored on the card to be read from the card and converted into electrical signals as the card moves past a read head located in the reader during insertion, (3) performing an electrical check on the information derived from the read head to provide a confirmation signal in the event that the information has been satisfactorily read, (4) producing a confirmation signal to indicate that information has been read satisfactorily and using the confirmation signal to generate a short duration pulse of operating current for a motor associated with the reader to operate a drive means for a permanent magnet to move said magnet into close proximity or contact with the region of the card bearing the information which has been read, the drive means being prevented from rotating completely whilst the card is in position, and (5) removing the card from the slot and in so doing enabling the drive means to rotate into a position in which the magnet is now held spaced from the card position, the magnet being moved into this position under the action of the restoring force, removal of the card also causing a set of perforating teeth to penetrate and mark the card.

12. A card reader having a card information reading mechanism and a card information erasure mechanism, the card erasure mechanism comprising a permanent magnet, means mounting the magnet for movement toward and away from a position occupied by a card inserted in the card reader, and first drive means operable in response to a satisfactory reading of the card for moving the magnet into at least close proximity with a region of the card on which magnetically readable information is stored, so as to destroy the magnetically stored information on the card, and further comprising an arm of resilient construction, said permanent magnet being carried at one end thereof, means pivotally mounting the arm to allow said one end of the arm to move in a direction towards and away from the plane of the card position, means coupling the drive means with the arm for moving said arm from a position where the magnet is remote from the card position to a position in which the magnet is at least in said close proximity to the inserted card after the card has been satisfactorily read, a yoke means pivotably about a mounting on the card reader with the axis of pivoting of the yoke approximately parallel to the plane of the card when inserted, means attaching the resilient are to the yoke, and a relatively rigid arm extending from the yoke and separate from the resilient arm carrying the magnet, the drive means acting on the yoke through the relatively rigid arm.

* * * * *